(12) United States Patent
Kloft et al.

(10) Patent No.: US 12,331,760 B2
(45) Date of Patent: Jun. 17, 2025

(54) HYDRAULIC ACCUMULATOR

(71) Applicant: Hydac Technology GmbH, Sulzbach / Saar (DE)

(72) Inventors: Peter Kloft, Ransbach-Baumbach (DE); Torsten Kusserow, Thörnich (DE); Norbert Lange, Saarbrücken (DE); Norbert Weber, Saarbrücken (DE); Armin Kort, Riegelsberg (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 18/259,720

(22) PCT Filed: Jan. 4, 2022

(86) PCT No.: PCT/EP2022/050078
§ 371 (c)(1),
(2) Date: Jun. 28, 2023

(87) PCT Pub. No.: WO2022/152593
PCT Pub. Date: Jul. 21, 2022

(65) Prior Publication Data
US 2024/0318669 A1    Sep. 26, 2024

(30) Foreign Application Priority Data
Jan. 14, 2021    (DE) ..................... 10 2021 000 139.7

(51) Int. Cl.
*F15B 1/10*     (2006.01)
*B23K 26/24*    (2014.01)
(Continued)

(52) U.S. Cl.
CPC .............. *F15B 1/106* (2013.01); *B23K 26/24* (2013.01); *F15B 1/125* (2013.01); *F15B 1/14* (2013.01);
(Continued)

(58) Field of Classification Search
CPC .................. F15B 1/14; F15B 2201/205; F15B 2201/3151; F15B 2201/41;
(Continued)

(56) References Cited

U.S. PATENT DOCUMENTS 3,847,182 A    11/1974  Greer ............................. 138/30
4,077,100 A     3/1978  Zahid ........................ 29/890.06
(Continued)

FOREIGN PATENT DOCUMENTS

DE    2 139 367         2/1973
DE        2139367 A  *  2/1973 ......... B23K 15/0046
(Continued)

OTHER PUBLICATIONS

Denis Richard, EP 0322294A1, Hydraulic Accumulator, EPO English Machine Translation, pp. 1-3 (Year: 1989).*
(Continued)

*Primary Examiner* — Bayan Salone
(74) *Attorney, Agent, or Firm* — Slayden Grubert Beard PLLC

(57) ABSTRACT

The disclosure relates to an hydraulic accumulator, in particular a diaphragm accumulator, having an accumulator housing and a separating element disposed therein, which separates two media spaces from each other, wherein a weld seam is formed by a laser or electron beam welding process without any filler materials, in that at least a part of the wall parts delimiting the transition point are melted to form the weld seam, which closes off the transition point towards the surroundings, in a manner that is free of protrusions with respect to an outer circumferential surface of a connection element.

25 Claims, 3 Drawing Sheets

(51) Int. Cl.
*F15B 1/12* (2006.01)
*F15B 1/14* (2006.01)

(52) U.S. Cl.
CPC . *F15B 2201/205* (2013.01); *F15B 2201/3151* (2013.01); *F15B 2201/605* (2013.01)

(58) Field of Classification Search
CPC ........ F15B 2201/4056; F15B 2201/415; F15B 2201/615; F15B 2201/605; F15B 1/22; F15B 1/106; F15B 1/125; B23K 26/24
See application file for complete search history.

(56) References Cited

U.S. PATENT DOCUMENTS

| | | | | |
|---|---|---|---|---|
| 4,098,297 | A | 7/1978 | Zahid | 138/30 |
| 6,901,965 | B2 | 6/2005 | Baltes et al. | 138/30 |
| 2004/0065374 | A1* | 4/2004 | Baltes | F15B 1/10 138/30 |
| 2011/0219761 | A1* | 9/2011 | Johnson | F15B 1/165 138/30 |

FOREIGN PATENT DOCUMENTS

| | | | | | |
|---|---|---|---|---|---|
| DE | 2604959 | A | * | 9/1976 | ............. F15B 1/125 |
| DE | 2719060 | C2 | * | 11/1977 | |
| DE | 3040053 | A | * | 5/1981 | ................ F15B 1/14 |
| DE | 3040053 | A1 | | 5/1981 | ................ F15B 1/14 |
| DE | 3404897 | A | * | 8/1985 | ................ F15B 1/14 |
| DE | 3404897 | A1 | | 8/1985 | ................ F15B 1/14 |
| DE | 2604959 | C2 | | 11/1986 | ................ F15B 1/08 |
| DE | 04244603 | A | | 9/1992 | ................ F15B 1/08 |
| DE | 10355435 | B3 | * | 5/2005 | ............. F15B 1/125 |
| DE | 102015012357 | A1 | * | 3/2017 | ............. F15B 1/106 |
| DE | 102017006064 | A1 | | 12/2018 | ................ F15B 1/10 |
| EP | 0 322 294 | | | 6/1989 | ............. F15B 1/047 |
| EP | 322294 | A | * | 6/1989 | ................ F15B 1/14 |
| EP | 1370772 | B1 | | 8/2004 | ................ F15B 1/08 |
| JP | 4244603 | B2 | * | 3/2009 | |
| WO | 02 075161 | | | 9/2002 | ................ F15B 1/10 |
| WO | WO-02075161 | A1 | * | 9/2002 | ................ F15B 1/10 |

OTHER PUBLICATIONS

Search Report for International Application No. PCT/EP2022/050078, 4 pages, Apr. 7, 2022.

International Search Report and Written Opinion, Application No. PCT/EP2022/050248, 12 pages, Mar. 18, 2022.

European Office Action, Application No. 22700136.9, 7 pages, May 24, 2024.

* cited by examiner

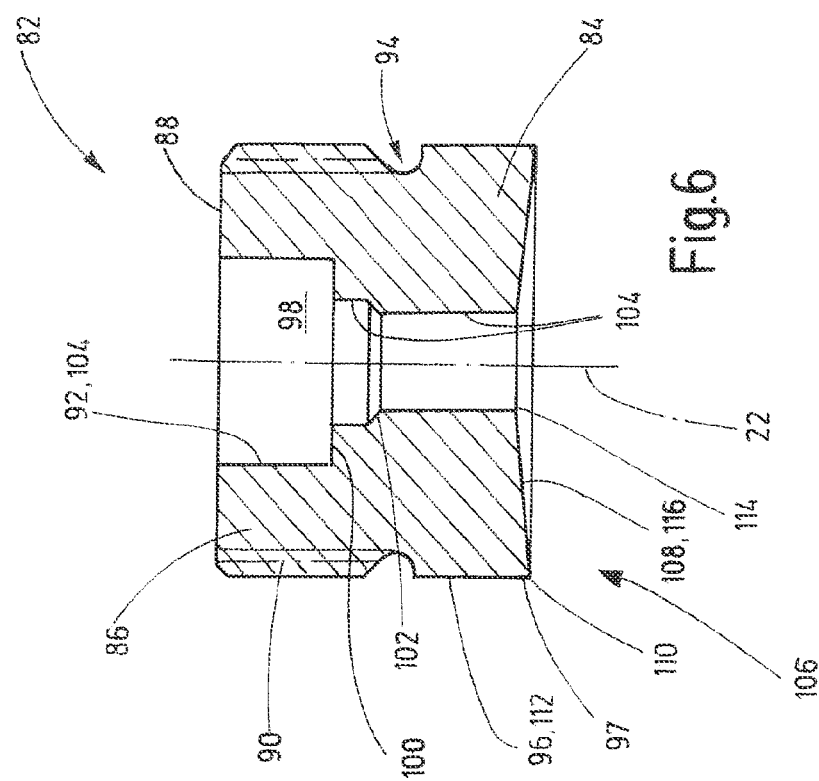
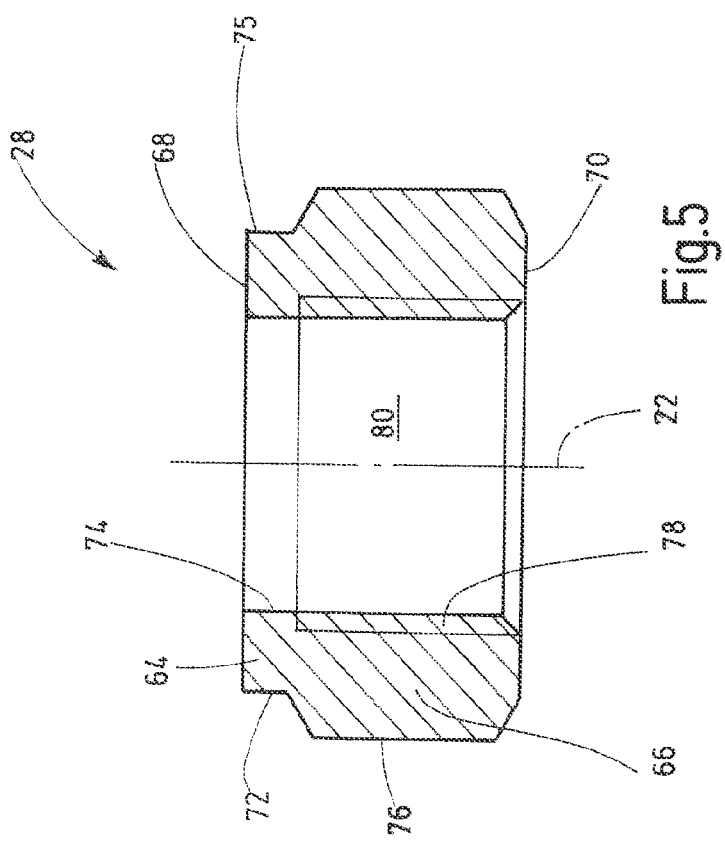

HYDRAULIC ACCUMULATOR

CROSS-REFERENCE TO RELATED APPLICATIONS

This application claims priority to German Patent Application No. DE 10 2021 000 139.7, filed on Jan. 14, 2021 with the German Patent and Trademark Office. The contents of the aforesaid Patent Application are incorporated herein for all purposes.

TECHNICAL FIELD

The invention relates to a hydraulic accumulator, in particular a diaphragm accumulator, having an accumulator housing and a separating element disposed therein, which separates two media spaces from each other, wherein the accumulator housing has at least one fluid port, which opens out into an adjacent media space and which has a connection element having an annular outer circumferential surface and a fluid point, which connection element is connected to the accumulator housing via a weld seam and which forms a transition point when placed on the accumulator housing at the end face.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

From DE 10 2017 006 064 A1 a hydraulic accumulator is known, having an accumulator housing defining a longitudinal axis, in which a diaphragm consisting of elastomeric material separates a liquid end from a gas end as a movable separating element, wherein the opening rim of the diaphragm is secured to the inside of the housing. For obtaining a slim design for the hydraulic accumulator, the diaphragm in an undeformed state has a length, measured in the direction of the longitudinal axis, which is at least twice the diameter of its opening rim, wherein the undeformed diaphragm extends between said opening rim and its closed end area having straight sheath lines converging towards the end area.

The accumulator housing of the hydraulic accumulator has, both on the gas end and on the liquid end, nozzle-like connection elements, the centers of which are each provided with a fluid passage point, which forms a fluid channel, which is routed in the direction of the longitudinal axis of the hydraulic accumulator and, on the one hand, forms a gas port for filling the gas end with a working gas, such as nitrogen, and, on the other hand, forms a liquid port for connecting the hydraulic accumulator to a hydraulic system, which is then connected to the liquid end in a fluid-conveying, in particular hydraulic oil-conveying, manner. The individual connection element has a circumferential groove on its connection area facing the outside of the housing, which is used to accommodate a welding filler material that is required to permanently connect the connection element to the accumulator housing in a fusion welding process wherein a fillet weld is created.

DE 10 2015 012 357 A1 discloses another diaphragm accumulator consisting of at least two housing parts of an accumulator housing, in which a separating element in the form of a separating diaphragm separates two media spaces from each other and having at least one media connection element connected to one housing part along a weld seam. The connection element engages, at least partially, in a receiving space formed in one housing part along a housing opening as a fluid passage point, wherein the wall surfaces of the accumulator housing part and the connection element adjacent to each other in the receiving space are permanently connected to each other by means of the weld seam. The weld seam referred to can be implemented by means of brazing, friction welding, electron beam welding or laser beam welding, for example without filler metal. Instead of a fillet weld to be inserted on the outside of the fillet, as shown in DE 10 2017 006 064 A1, the internal weld in the form of a smooth weld ensures a tight fit against transverse forces, which makes for a particularly secure, durable connection. The internal weld seam, which is shielded from the environment, is also protected from damaging environmental influences that could lead to corrosion. However, the smooth weld seam referred to must be produced from the inside of the shell shape of the housing part between its adjacent inner wall and the outer wall, which is engaged in this respect, of the connection element, which is correspondingly complex and therefore cost-intensive in terms of production technology.

SUMMARY

Based on this, a need exists of producing a high-strength welded joint between connection elements forming fluid ports and assigned accumulator housings, while retaining benefits of known solutions, in such a way that the manufacturing effort is reduced. The need is addressed by the subject matter of the independent claims. Embodiments of the invention are described in the dependent claims, the following description, and the drawings.

BRIEF DESCRIPTION OF THE DRAWINGS

FIGS. 5 and 6 show a connection element used at the liquid end according to FIGS. 1 and 2 and the connection element at the gas end according to the representation in FIGS. 3 and 4, respectively, both as longitudinal sectional views.

DESCRIPTION

Figure 1:
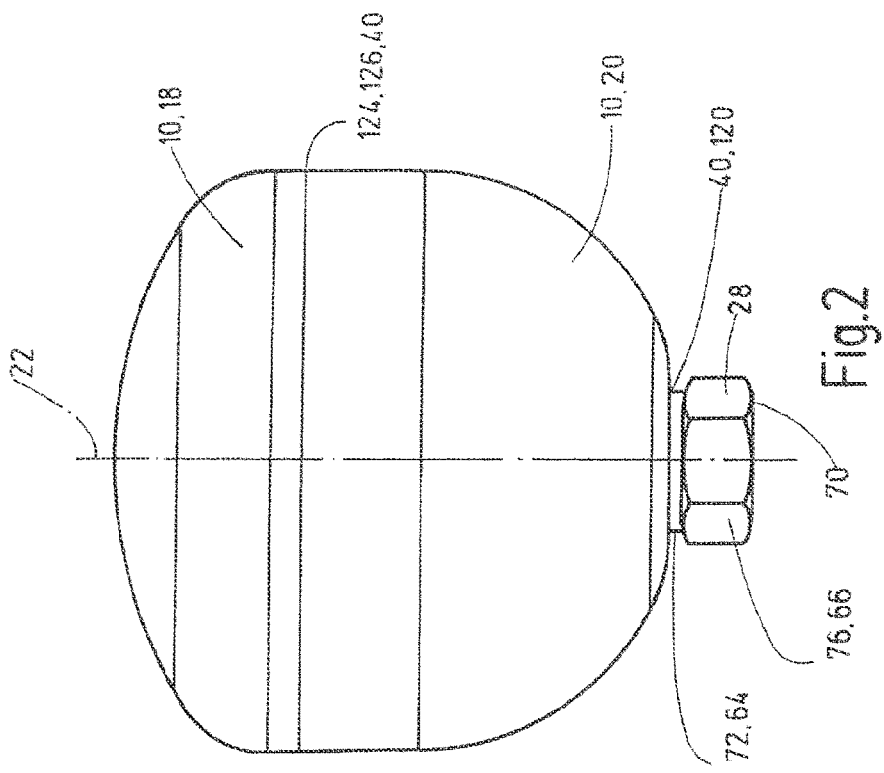
FIGS. 1 and 2 show an embodiment of a hydraulic accumulator in a longitudinal section view in a plan view.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the weld seam is formed by a laser or electron beam welding process without any filler materials, in that at least a part of the wall parts delimiting the transition point are melted to form the weld seam, which closes off the transition point toward the surroundings, in a manner that is free of protrusions with respect to the outer circumferential surface of the connection element. In this respect, no fillet is to be formed in the connection element to accommodate a fillet weld at a later date, which wedges the joint or transition point between the connection element and the adjacent housing wall with a projecting rim in both directions.

While in the known hydraulic accumulator solution according to DE 10 2017 006 064 A1, the fillet weld to this effect has to be executed without interruption at the optimum penetration depth resulting in high manufacturing cost, in particular because in many cases a welding filler is required to perform the fusion welding, this is avoided in the solution according to the teachings herein, because the welded joint is formed directly in the transition point, between the closed annular outer circumferential surface of the connection area and the top of the accumulator housing in this connection area. Because no welding filler material is required, any risk of corrosion is also effectively countered and the material interference otherwise caused by the penetration in the components to be joined during the production of the fillet weld, which can otherwise result in material damage in the connection area, is eliminated. The weld joint ends at the transition point essentially free of protrusions and is designed as a thin weld line.

In some embodiments of the hydraulic accumulator, provision is made for the free end of the outer circumferential surface of the connection element to transition into a circumferential rim, from which a plane contact surface or a depression made in the end face of the connection element adjoins in the direction of the fluid port. In this way, a thin boundary surface is created between the connection element and the adjacent wall parts of the accumulator housing, which forms the linear transition point for inserting the weld seam. If the accumulator housing wall is designed in the form of a flat plane, the adjacent contact surface of the connection element can also be designed to be plane. If, on the other hand, the accumulator housing wall is provided with a corresponding curvature, in particular if it follows a convex wall course as viewed from the outside, it is beneficial to insert a depression in the connection element, starting from the circumferential rim, towards the inside in the direction of the fluid port, which for example follows the convex course of the accumulator housing wall. In both cases, there is then a direct contact of adjacent wall surfaces of the connection element and the assigned parts of the accumulator tank housing wall, such that with the introduction of the weld seam into the transition area formed in this way over a relatively large area, the tight connection between said components is established.

Viewed from the operating pressure situation of the individual hydraulic accumulator, it is beneficial that the plane contact surface of the connection element is placed on an equally plane accumulator housing wall, which encompasses the one fluid port, in particular for the passage of a liquid, such as hydraulic oil. On the other hand, the gas supply in the accumulator housing of the hydraulic accumulator is curved or convex towards the outside in the area of the fluid port for the working gas in terms of a reliable operating pressure absorption, i.e., a matching depression is incorporated in the connection element to be welded.

For example, the depression does not have to follow the convex course of the wall directly but can also be formed from a slightly inclined annular cone, having an inclination of 4° to 10°, for example of approximately 6°, which simplifies the manufacture of the connection element.

In order to be able to provide high welding energies, provision is for example made for the circumferential rim of the connection element to be part of the welded joint between the connection element and the adjacent accumulator housing.

For the production of such fluid connections, a hydraulic accumulator is for example provided with a matching threaded section on the outer or inner circumference of the connection element in the area of the fluid passage point. In a further embodiment of the hydraulic accumulator, to be bi-partite, for example consisting of shell parts, and for the accumulator housing parts to be connected at their adjacent end faces by the same welding process as that used to connect the connection element to the accumulator housing. In this way, all the required welded joints on the accumulator housing can be produced from the outside using just one welding device, for instance by means of a laser.

The teachings herein also address the problem of providing a connection element for a hydraulic accumulator solution described above, which can be used to retrofit such hydraulic accumulators, if necessary.

A beneficial manufacturing process for such welded joints in a hydraulic accumulator is characterized by that a laser or electron beam produces the welded joint between the rim of the connection element and the adjacent accumulator housing wall at a right angle and circumferentially, wherein the welding device is for example disposed in a stationary manner and the hydraulic accumulator is movably guided about its longitudinal axis as a rotationally symmetrical component, wherein the rotational speed of the accumulator is adapted to the welding speed of the manufacturing device.

Because the weld seam can be produced without problems from the outer circumference of the accumulator housing in conjunction with the connection element, the weld seam can be precisely produced from the outside, which is much simpler and more cost-effective in terms of production technology than if the welded joint has to be produced in the form of a smooth seam from the inside of the respective shell-like accumulator housing parts, as shown in DE 10 2015 012 357 A1. Due to the thin, linear weld seam, the weld seam can be implemented quickly, achieving great savings in the manufacturing process, particularly in the production of mass-produced parts.

Below, the solution according to the teachings herein is discussed in more detail based on further embodiments with reference to the drawings.

Specific references to components, process steps, and other elements are not intended to be limiting. Further, it is understood that like parts bear the same or similar reference numerals when referring to alternate FIGS.

Figure 2:
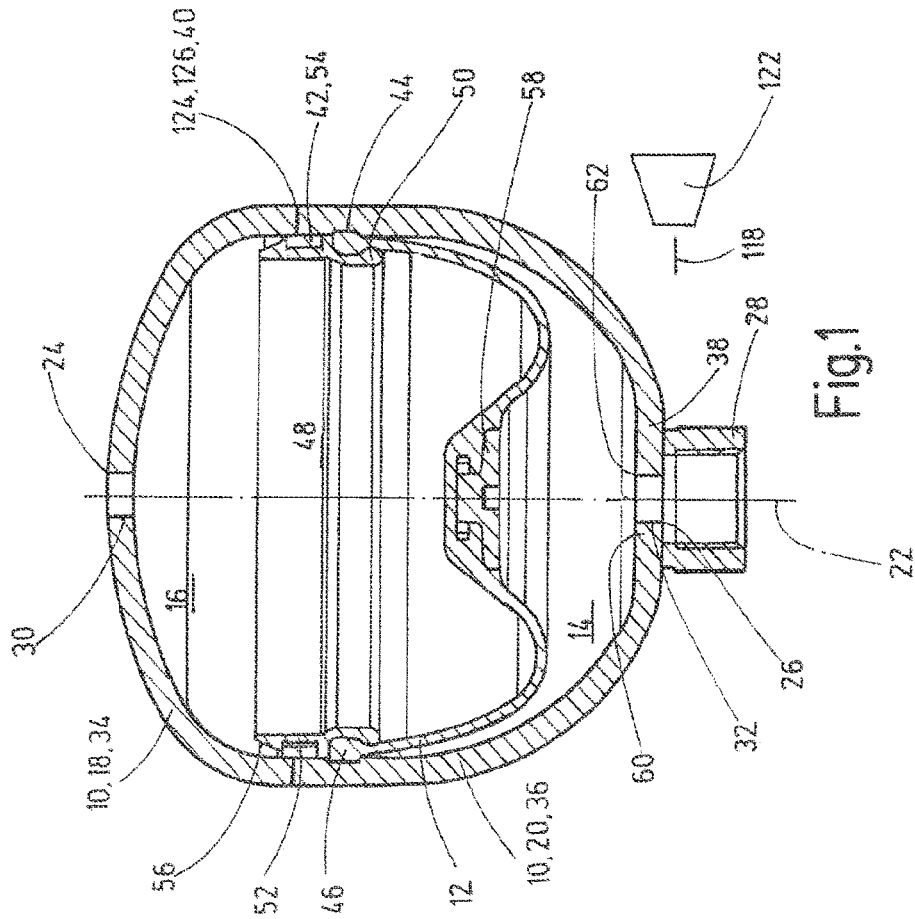
Figure 4:
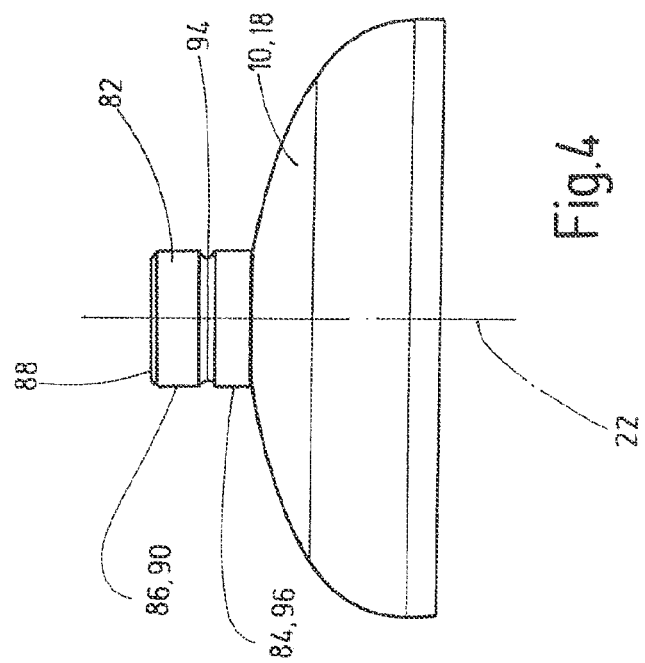
FIGS. 3 and 4 show an upper housing wall shell of the hydraulic accumulator according to FIGS. 1 and 2 with attached welded connection element on the gas end in a longitudinal section and in a plan view.
Figure 3:
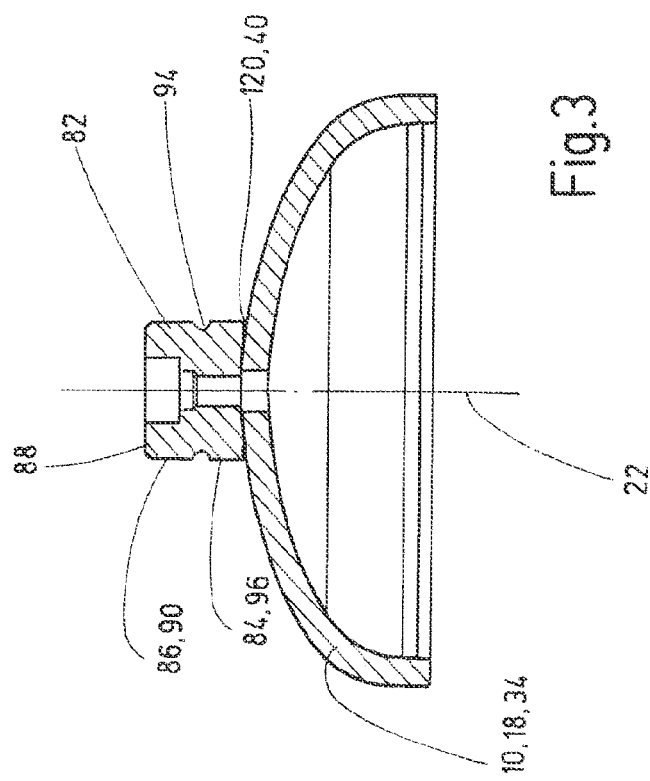

The hydraulic accumulator shown in FIGS. 1 and 2 is a so-called diaphragm accumulator having a separating element 12 in the form of a diaphragm disposed in an accumulator housing designated as a whole by the numeral 10. It subdivides the interior of the housing 10 into a media space 14 in the form of a fluid space for storing a liquid, in particular hydraulic oil, and a further media space 16 in the form of a gas space for storing a working gas, in particular nitrogen gas. Referring to FIG. 1, the housing 10 comprises an upper housing part 18 and a lower housing part 20, each having a circular shell shape with a central axis 22, which are each identical to the longitudinal axis of the hydraulic accumulator. The upper housing part 18 has a flatter shell shape than the lower housing part 20. At the end of the accumulator housing 10 opposite from the fluid space 14, i.e., at the end assigned to the gas space 16, the upper housing part 18 comprises an upper fluid port 24 concentric with the axis 22. A plug (not shown in the FIGS.) or solder may be used to seal the upper fluid port 24 after the gas space 16 has been filled. A lower fluid port 26, where a lower connection element 28 is attached as an oil port, via which the accumulator can be connected to a hydraulic system (not shown), is provided on the lower housing part 20, concentric to the axis 22.

The upper 18 and lower 20 housing parts comprise a central upper 30 and lower 32 fluid passage, respectively, each extending along the longitudinal axis 22 from the upper fluid port 24 centrally through an accumulator housing wall 34 of the upper housing part 18 and terminating in the gas space 16 or from the lower fluid port 26 centrally through an accumulator housing wall 36 of the lower housing part 20 and terminating in the fluid space 14. The housing wall 34 of the upper housing part 18 extends from a constant outer diameter away from the lower housing part 20 and is arched outwards toward the longitudinal axis 22 of the hydraulic accumulator up to the central upper fluid passage 30. Starting from a constant outer diameter, the housing wall 36 of the lower housing part 20 initially extends away from the upper housing part 18 and is arched outwards toward the longitudinal axis 22 of the hydraulic accumulator and subsequently transitions into a plate 38, which is plane and disk-shaped on both sides and through the center of which the lower fluid channel 32 extends.

The upper 18 and lower 20 housing parts, which abut along a weld 40, are interconnected by a laser or electron beam welding process.

In the area of the seam 40, a protective ring 42 in the form of a metallic flat ring is attached to the inner wall of the accumulator housing 10. An annular groove-like notch 44 is formed in the inner wall of the lower housing part 20 spaced apart from the protective ring 42 for securing the diaphragm 12 in the accumulator housing 10. The notch 44 forms a seat for a thickened, circumferential bulged rim 46 of the diaphragm 12.

A retaining ring 48 is provided to secure the engagement of the bulged rim 46 with the notch 44, the retaining ring having a retaining part 50, which forms a partial enclosure around the inside of the bulged rim 46 offset inwards from the outer circumference of the retaining ring 48. Extending axially from the retaining part 50 toward the upper housing part 18, the retaining ring 48 has an annular cylindrical part 52 that extends between the two housing parts 18, 20 beyond the weld area 40. On the outer circumference, the cylinder part 52 forms an annular groove 54 as a seat for the protective ring 42. The protective ring can be snapped into the annular groove 54 by sliding it over inclined surfaces 56 at the free end of the cylinder part. For assembly, the diaphragm 12 can be inserted into the lower housing part 20 in conjunction with the retaining ring 48 and the protective ring 42 when the accumulator housing 10 is open, wherein the protective ring 42 comes into a position covering the weld area 40 when inserted.

FIG. 1 shows the diaphragm accumulator in an operating state in which the diaphragm 12 is in an intermediate position, in which there is pressure balance on both sides of the diaphragm 12 because the hydraulic system, which is connected to the lower connection element 28 forming the oil port but is not shown, generates a fluid pressure in the fluid space 14, which is equal to the pressure existing in the gas space 16. In conditions where there is little or no oil pressure in the fluid space 14, the diaphragm 12, when viewed in the direction shown in the figure, moves downward and rests against the inside of the lower housing part 20, wherein the diaphragm 12 covers a rim 60 of the inlet 62 of the lower fluid passage 32 into the fluid space 14 with a valve body 58 located at its central surface area, forming a valve seat, and thus forming a valve arrangement at the inlet 62 of the fluid passage 32 into the fluid space 14.

For example, the lower fluid port 26 is not closed by a plug or solder but has a lower connection element 28 formed by a connection part 64 abutting the lower housing part 20 and a connector 66 integrally connecting to the connection part 64 in a direction away from the lower housing part 20.

A first end face 68 of the connection part 64 forming an abutment surface for the lower housing part 20, and a second end face 70 of the connector 66 of the lower connection element 28 opposite from the first end face 68, are each plane and oriented perpendicular to the longitudinal axis 22 of the hydraulic accumulator. At each of its radially outer and inner ends, the first end face 68 transitions into a cylindrical, annular, and recess-free outer 72 and inner circumferential surface 74, respectively, of the connection part 64, which are coaxially oriented with the longitudinal axis 22 of the hydraulic accumulator. An annular end part of the outer circumferential surface 72 of the connection part 64 facing the lower housing part 20 forms a rim 75, which is part of a welded joint 40 between the connection element 28 and the lower housing part 20. In the direction away from the lower housing part 20, an outer hexagon 76 of the connector 66 adjoins the outer circumferential surface 72 of the connection part 64, and a female thread 78 of the connector 66 adjoins the inner circumferential surface 74 of the connection part 64 for engaging a male thread of a fluid line not shown in the figures, each of which transition into the second end face 70 of the connector 66 at its end facing away from the lower housing part 20. The hollow design of the lower connection element 28 forms a central fluid passage point 80 for fluid to pass through the lower connection element 28. The smallest inner diameter of the fluid passageway 80 is greater than, in particular about 1.8 times greater than, the inner diameter of the lower fluid passageway 32 through the lower housing part 20. The diameter of the disk-shaped plate 38 of the lower housing part 20 is larger than the outer diameter of the lower connection element 28, at least in the area of its connection part 64.

The upper fluid port 24 has an upper circular cylindrical connection element 82. This is a gas port of the usual type having an internal filling valve, not shown in more detail in the figures, via which the gas space 16 can be pre-filled with a working gas, in particular nitrogen gas.

The connection element 82 is formed from a further connection part 84 abutting the upper housing part 18 and a further connector 86 integrally adjoining the further connection part 84 in a direction away from the upper housing part 18.

An end face 88 of the further connector 86 of the upper circular-cylindrical connection element 82, which faces away from the upper housing part 18, is annular and plane and oriented perpendicular to the longitudinal axis 22 of the hydraulic accumulator. At its radially outer end, the end face 88 of the further connector 86 of the upper connection element 82 facing away from the upper housing part 18 transitions into a male thread 90 and, at its radially inner end, into a circular-cylindrical, annular, and recess-free inner circumferential surface 92 of the further connector 86. The male thread is used to engage a female thread of a fluid line not shown in the figures or a plastic screw cap to cover the upper connection element 82. In the direction towards the upper housing part 18, a, viewed in cross-section, nose-shaped annular recess 94 of the outer circumference of the upper connection element 82 adjoins the male thread 90, which recess, oriented perpendicular to the longitudinal axis 22 of the hydraulic accumulator, completely encompasses the upper connection element 82 and forms an outlet of the male thread 90 of the upper connection element 82. In a direction toward the upper housing part 18, the nose-shaped recess 94 adjoins a circular-cylindrical, annular, and recess-free outer circumferential surface 96 of the further annular end part of the outer connection part 84. An circumferential surface 96 of the further connection part 84 facing the upper housing part 18 forms a rim 97, which is part of a welded joint 40 between the connection element 82 and the upper housing part 18. The inner diameter of a central fluid passage point 98 of the upper connection element 82 decreases from the end face 88 facing away from the upper housing part 18 toward the upper housing part 18, forming a step 100 and a subsequent tapered transition area 102. A circular cylindrical, annular, and recess-free inner circumferential surface 104 of the fluid passage 98 is provided between the end face 88 facing away from the upper housing part 18 and the step 100, between the step 100 and the transition part 102, and between the transition part 102 and the end 114 of the fluid passage 98 facing the upper housing part 18, respectively.

A depression 108 is formed in an end 106 of the upper cylindrical connection element 82 facing the upper housing part 18. The end 110 of the outer wall 112 of the upper connection element 82 facing the upper housing part 18 protrudes from the end 114 of the fluid passageway 98 facing the upper housing part 18, which forms the maximum of the depression 108. The minimum of the depression 108 is provided in direct abutment with the end 110, facing the upper housing part 18, of the outer wall 112 of the upper connection element 82. Between the end 110 of the outer wall 112 of the upper connection element 82 facing the upper housing part 18 and the end 114 of the fluid passage point 98 facing the upper housing part 18, the bottom 116 of the depression 108 tapers in the direction of the longitudinal axis 22 of the hydraulic accumulator and away from the lower housing part 20. The angle of taper of the bottom 116 with respect to a notional plane oriented perpendicular to the longitudinal axis 22 of the hydraulic accumulator is adapted to the curved shape of the outer wall of the upper housing part 18 in the area around the upper fluid port 30 and is for example about 6 degrees.

For welding the respective housing part 18, 20 to the assigned connection element 28, 82, the plane first end face 68 of the connection part 64 of the lower connection element 28, which forms an abutment surface, is placed on the disc-shaped plate 38 of the lower housing part 20 from the outside and oriented coaxially, such that the entire surface of the plane first end face 68 of the connection part 64 of the lower connection element 28 is in contact with the plate 38. In addition, the further connection part 84 of the upper connection element 82 with its tapered depression 108 is placed on the curved upper housing part 18 from the outside in a coaxially oriented manner, wherein the upper housing part 18 engages with its curved outer wall in the depression 108. In so doing, a part of the total surface of the bottom 116 is loop-shaped or ring-shaped, in particular in the area of the rim 97, and in contact with the upper housing part 18. Subsequently, a laser or electron beam 118 oriented perpendicular to the longitudinal axis 22 of the hydraulic accumulator acts on a linear and annular transition point 120 between the rim 75, 97 of the outer circumferential surface 72, 96 of the connection part 64, 84 of the respective connection elements 28, 82 and the outer wall of the respective accumulator housing part 18, 20 and produces there, in particular by melting the connection element, at least at the rim 75, 97 and/or the outer wall of the respective accumulator housing parts 18, 20 at least in the area of these rims 75, 97, one weld seam 40 each, by means of which the respective connection elements 28, 82 are firmly connected to the adjacent housing parts 18, 20. In this case, the rims 75, 97 of the respective connection elements 28, 82 and/or of the outer wall of the respective accumulator housing parts 18, 20 are part of the welded joint 40. In addition, the welding process is free of filler metal.

The welding device 122 emitting the beam 118 is stationary and the rotationally symmetrical hydraulic accumulator is rotated about its longitudinal axis 22 at a rotational speed adapted to the welding speed of the welding device 122.

The same welding process is used to weld the two housing parts 18, 20 are together at their facing end faces 124 at their open ends. When welding is performed to close the housing 10, the protective ring 42 is welded tightly to the inside of the accumulator housing 10 in the connection area 126 of the two housing parts 18, 20 and forms a thermal shield with respect to the retaining ring 48. As a result, the retaining ring 48 can be produced rationally and inexpensively as an injection-molded part from a structurally strong plastic material.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A hydraulic accumulator, having an accumulator housing and a separating element disposed therein, which separates two media spaces from each other, wherein the accumulator housing has at least one fluid port which opens out into an adjacent media space and which has a connection element having an annular outer circumferential surface and a fluid passage bore, which connection element is connected to the accumulator housing via a weld seam, which weld seam forms a transition point between the accumulator housing and the connection element at an end face of the connection element; wherein the weld seam is formed by a laser or electron beam welding process without any filler materials; wherein at least a part of wall parts delimiting the transition point are melted to form the weld seam, which closes off the transition point towards surroundings in a manner that is free of protrusions with respect to the outer circumferential surface of the connection element; wherein the outer circumferential surface of the connection element transitions into a circumferential rim; and wherein a depression is formed in the end face of the connection element, extending from the circumferential rim to the fluid passage bore.

2. The hydraulic accumulator of claim 1, wherein a course of the depression in the connection element is adapted to a curved accumulator housing wall, which engages at least partially with the depression and which encompasses a further fluid port, in particular for the passage of a working gas, such as nitrogen gas.

3. The hydraulic accumulator of claim 1, wherein the depression forms a slightly inclined annular cone having an inclination of 4° to 10°.

4. The hydraulic accumulator of claim 1, wherein the circumferential rim of the connection element is part of a welded joint between the connection element and the accumulator housing.

5. The hydraulic accumulator of claim 1, wherein the connection element comprises, on the outer or inner circumference in the area of the fluid passage bore for the purpose of connecting a fluid line, a threaded section as part of a connector, which is offset from a connection part of the connection element, which connection part is used at least partially for attaching the weld seam and comprises the annular outer circumferential surface.

6. The hydraulic accumulator of claim 1, wherein an accumulator housing wall in the area of the weld seam, viewed in cross-section, extends in a straight line or, provided with a convex curvature, engages at least partially with the depression of the connection element.

7. The hydraulic accumulator of claim 1, wherein the accumulator housing is bi-partite and in that accumulator housing parts are connected at their adjacent end faces by the same welding process as that used to connect the connection element to the accumulator housing.

8. A connection element for a hydraulic accumulator, comprising at least one connector and one connection part for the purpose of connecting a fluid line or for producing a welded seam connection, respectively; wherein the connection part has, on its free end face facing away from the connector, a depression, which depression extends from an outer-circumferential rim to a fluid passage bore, which fluid passage bore passes through the connector and connection part.

9. A method for producing a welded joint in a hydraulic accumulator, comprising applying a laser or electron beam between a connection element and an adjacently disposed accumulator housing at right angles and circumferentially to the rim of the connection element adjacent to the accumulator housing or to a transition area between this rim and parts of the adjacently disposed accumulator housing, wherein the connection element comprises a depression extending from an outer-circumferential rim to a fluid passage bore.

10. The hydraulic accumulator of claim 1, wherein the hydraulic accumulator is a diaphragm accumulator.

11. The hydraulic accumulator of claim 1, wherein the depression forms a slightly inclined annular cone having an inclination of approximately 6°.

12. The hydraulic accumulator of claim 2, wherein the depression forms a slightly inclined annular cone having an inclination of 4° to 10°.

13. A hydraulic accumulator, having an accumulator housing and a separating element disposed therein, which separates two media spaces from each other, wherein the accumulator housing has at least one fluid port which opens out into an adjacent media space and which has a connection element having an annular outer circumferential surface and a fluid passage point, which connection element is connected to the accumulator housing via a weld seam and which forms a transition point when placed on the accumulator housing at the end face; wherein the weld seam is formed by a laser or electron beam welding process without any filler materials, so that at least a part of wall parts delimiting the transition point are melted to form the weld seam, which weld seam closes off the transition point towards the surroundings in a manner that is free of protrusions with respect to the outer circumferential surface of the connection element; and wherein a depression forms a slightly inclined annular cone having an inclination of 4° to 10°.

14. The hydraulic accumulator of claim 13, wherein the depression forms the slightly inclined annular cone having an inclination of approximately 6°.

15. The hydraulic accumulator of claim 13, wherein a free end of the outer circumferential surface of the connection element transitions into a circumferential rim, from which a plane contact surface or a depression made in the end face of the connection element adjoins in the direction of the fluid port.

16. The hydraulic accumulator of claim 13, wherein a plane contact surface of the connection element is placed on an equally plane accumulator housing wall, which encompasses the one fluid port, in particular for the passage of a liquid, such as hydraulic oil.

17. The hydraulic accumulator of claim 13, wherein a course of the depression in the connection element is adapted to a curved accumulator housing wall, which engages at least partially with the depression and which encompasses a further fluid port, in particular for the passage of a working gas, such as nitrogen gas.

18. The hydraulic accumulator of claim 13, wherein a circumferential rim of the connection element is part of a welded joint between the connection element and the accumulator housing.

19. The hydraulic accumulator of claim 13, wherein the connection element comprises, on the outer or inner circumference in the area of the fluid passage point, for the purpose of connecting a fluid line, a threaded section as part of a connector, which is offset from a connection part of the connection element, which connection part is used at least partially for attaching the weld seam and comprises the annular outer circumferential surface.

20. The hydraulic accumulator of claim 13, wherein an accumulator housing wall in the area of the weld seam, viewed in cross-section, extends in a straight line or, provided with a convex curvature, engages at least partially with the depression.

21. The hydraulic accumulator of claim 13, wherein the accumulator housing is bi-partite and in that the accumulator housing parts are connected at their adjacent end faces by the same welding process as that used to connect the connection element to the accumulator housing.

22. A hydraulic accumulator, having an accumulator housing and a separating element disposed therein, which separates two media spaces from each other, wherein the accumulator housing has at least one fluid port which opens out into an adjacent media space and which has a connection element having an annular outer circumferential surface and a fluid passage point, which connection element is connected to the accumulator housing via a weld seam, which weld seam forms a transition point between the accumulator housing and the connection element at an end face of the connection element; wherein the weld seam is formed by a laser or electron beam welding process without any filler materials; wherein at least a part of wall parts delimiting the transition point are melted to form the weld seam, which closes off the transition point towards the surroundings in a manner that is free of protrusions with respect to the outer circumferential surface of the connection element; wherein the outer circumferential surface of the connection element transitions into a circumferential rim; wherein a depression is formed in the end face of the connection element, extending from the circumferential rim to the fluid passage point; wherein a course of the depression in the connection element is adapted to a curved accumulator housing wall, which engages at least partially with the depression and which encompasses a further fluid port, in particular for the passage of a working gas, and wherein the depression forms a slightly inclined annular cone having an inclination of 4° to 10°.

23. A hydraulic accumulator, having an accumulator housing and a separating element disposed therein, which separates two media spaces from each other, wherein the accumulator housing has at least one fluid port which opens out into an adjacent media space and which has a connection element having an annular outer circumferential surface and a fluid passage point, which connection element is connected to the accumulator housing via a weld seam, which weld seam forms a transition point between the accumulator housing and the connection element at an end face of the connection element; wherein the weld seam is formed by a laser or electron beam welding process without any filler materials; wherein at least a part of wall parts delimiting the transition point are melted to form the weld seam, which closes off the transition point towards surroundings in a manner that is free of protrusions with respect to the outer circumferential surface of the connection element; wherein the outer circumferential surface of the connection element transitions into a circumferential rim; wherein a depression is formed in the end face of the connection element, extending from the circumferential rim to the fluid passage; wherein wherein the depression forms a slightly inclined annular cone having an inclination of approximately 6°.

24. The hydraulic accumulator of claim 1, wherein the depression comprises a bottom surface that is tapered in a direction of a longitudinal axis of the hydraulic accumulator, away from the accumulator housing.

25. The connection element of claim 8, wherein the depression comprises a bottom surface that is tapered in a direction of a longitudinal axis of the hydraulic accumulator, away from the accumulator housing.

* * * * *